United States Patent [19]
Brinton

[11] Patent Number: 5,309,703
[45] Date of Patent: May 10, 1994

[54] MOBILE APPARATUS FOR TURNING AND AERATING COMPOST MATERIALS IN A COMPOST WINDROW

[75] Inventor: William F. Brinton, Mt. Vernon, Me.

[73] Assignee: Wood's End Research Laboratory, Inc., Mount Vernon, Me.

[21] Appl. No.: 860,427

[22] Filed: Mar. 30, 1992

[51] Int. Cl.⁵ ............................................. A01D 78/00
[52] U.S. Cl. ........................................ 56/370; 56/372; 366/345; 241/101.7; 406/39
[58] Field of Search ............... 366/345, 346, 101, 102, 366/103, 318, 321; 241/101.7; 56/194, 192, 366, 370, 372, 376, 378, 396; 37/238, 110; 406/39, 55, 70, 113, 117

[56] References Cited

U.S. PATENT DOCUMENTS

| | | | |
|---|---|---|---|
| 2,510,702 | 6/1950 | Liebig et al. | 100/102 |
| 2,529,422 | 11/1950 | Sampson | 56/Dig. 21 |
| 2,741,892 | 4/1956 | Collette | 56/372 |
| 3,004,799 | 10/1961 | Tikal | 406/55 |
| 3,597,906 | 8/1971 | Bodine | 56/14.1 |
| 3,828,536 | 8/1974 | Fowler | 241/101.7 |
| 4,338,985 | 7/1982 | Smith et al. | 241/101.7 |
| 4,767,067 | 8/1988 | Bruer et al. | 241/101.7 |

FOREIGN PATENT DOCUMENTS

| | | | |
|---|---|---|---|
| 0039286 | 11/1981 | European Pat. Off. | 56/370 |
| 1246552 | 3/1967 | Fed. Rep. of Germany | 406/39 |
| 441595 | 2/1973 | U.S.S.R. | 366/345 |
| 0485718 | 1/1974 | U.S.S.R. | 56/376 |
| 0826994 | 5/1980 | U.S.S.R. | 56/370 |

Primary Examiner—Harvey C. Hornsby
Assistant Examiner—Tony G. Soohoo
Attorney, Agent, or Firm—Frederick R. Cantor

[57] ABSTRACT

A mobile apparatus for turning, and otherwise agitating, compost materials in an elongated windrow, is described. The invention includes a chute structure, that can be moved into, and along, the windrow. A toothed drum, at the leading end of the chute structure, penetrates the compost material, and throws it upwardly, and rearwardly, onto an inclined conveyor. The conveyor transports the materials upwardly to a discharge point, located at the trailing end of the chute structure. Gravitational forces cause the materials to intermittently fall back toward the drum, thereby churning and mixing the materials. Pressurized air is continually sprayed onto the materials on the conveyor, in order to aerate the materials while they are being churned and transported.

4 Claims, 3 Drawing Sheets

MOBILE APPARATUS FOR TURNING AND AERATING COMPOST MATERIALS IN A COMPOST WINDROW

BACKGROUND OF THE INVENTION

The present invention relates to a mobile apparatus for turning, and otherwise agitating and aerating, compost materials, in a compost windrow. The apparatus has particular utility in long, relatively massive compost windrows, measuring, e.g., three hundred feet long, sixteen feet wide and eight feet high.

It has become a practice in the composting of biodegradable materials on a mass production basis, to arrange the compost materials in long stacks, or windrows, having humped semi-cylindrical configurations. Periodically, e.g., twice a week, it is necessary to recombine, or stir up the compost materials, in order to quicken, or facilitate, the oxidation and biodegradation process, throughout the windrow. The periodic stirring, or mixing, of the compost materials, redistributes the microbiological agents, and also breaks up the partially decomposed materials into smaller particles, that are then more readily oxidized, and biologically broken down. Another function of the periodic mixing operation, is to aerate the mass of compost materials buried within the interior of the windrow, i.e., beneath the windrow outer surface. Aeration is believed essential to reasonably short biological degradation action.

Conventional apparatus for turning or remixing the compost materials in an elongated windrow, often involves a tunnel-like apparatus that embraces the windrow and moves along the windrow length. A power-driven drum, or rotary rake mechanism, within the tunnel, churns up the compost materials, as the apparatus moves along the length of the windrow. In some cases, the rotary rake merely moves through the compost materials to spread the materials apart.

Another conventional windrow turning apparatus has a powered inclined endless web mechanism on its front end for penetrating the end face of the windrow, as the apparatus moves in a lengthwise direction along the windrow. The endless web has projecting teeth, that exert a shredding action on the compost materials, as the apparatus moves forward into the compost pile, or windrow. In the process, the motion of the web shoots the compost material upwardly, and forwardly, in front of the apparatus.

None of the conventional machines, with which we are familiar, includes the critical aeration mechanisms of the present invention. Aeration is achieved only to a very limited extent, by the churning movement of the compost materials upwardly out of the compost bed. As each particle becomes airborne, it is to a certain extent aerated, at least on its surface.

We believe that there is a clear need for a low cost compost-turning apparatus, that will also produce a greater degree of forced aeration, while at the same time achieving a satisfactory mixing and shredding action. In regard to the cost factor, it is believed that large scale composting could be made more attractive, if machines could be developed that would utilize conventional farm tractors for moving the apparatus and powering the rotary components on the apparatus. One object of the present invention is to provide just such an apparatus, i.e., a compost apparatus that can be towed and operated, in conjunction with a conventional tractor.

SUMMARY OF THE INVENTION

The present invention contemplates a mobile apparatus that can be propelled lengthwise into, and along, a compost windrow, so as to shred and propel the compost materials at the leading end of the apparatus. A conveyor mechanism, within the apparatus, also transports the churned-up materials through the apparatus for discharge through its trailing end. In its preferred form, the conveyor mechanism comprises a rotary-toothed drum, and a rearwardly-inclined conveyor, wherein the conveyor may be a belt, or an array of rollers. The toothed drum serves to shred the compost materials, and throw them onto the inclined conveyor.

The apparatus can be configured as a self-propelled apparatus of the tunnel-type. However, as indicated, in a lower cost version, the apparatus is constructed as a towable mechanism, adapted for movement via a conventional farm tractor. The apparatus can, for example, include an attachment portion adapted to connect with a three-point hitch, located at the rear end of the tractor. In this embodiment, the apparatus is oriented alongside the tractor, so that only the apparatus moves through the windrow, while the tractor moves through a path that parallels the windrow.

The conventional power take off at the rear end of the tractor, is used to provide power for operating the shredding and conveyor mechanisms, in the compost-turning apparatus. Additionally, the power take off is used to power an air compressor that provides compressed, or pressurized air for the purpose of aerating the subdivided compost materials, while they are being transported by the conveyor.

The forced air aerating action is carried out while the materials are in a maximum state of subdividization on the conveyor. It is believed that by the forced air aeration, a more effective aeration action can be achieved, compared to the action that has heretofore been possible, using the prior art devices. Aeration is carried out in combination with shredding and turning of the compost materials, thus, the entire treatment, i.e., shredding, turning and aeration, is completed in one pass of the apparatus of the present invention.

In accordance with the above and additional features of the present invention, described below, the following exemplary embodiments are herein described.

1. A mobile apparatus for turning and recombining subdivided compost materials in an elongated compost windrow, as said apparatus advances into and along the windrow length; said apparatus having a leading end and a trailing end; a transversely extending rotary drum at said apparatus leading end, for propelling compost materials upwardly and away from said windrow as the said drum penetrates said windrow; a conveyor means, having a leading end, in near proximity to said rotary drum, and a trailing end, at said trailing end of said apparatus, whereby compost materials are transported away from said drum; and a means for injecting pressurized air into said compost materials, while they are being transported by said conveyor means.

2. The apparatus, as described in paragraph 1, wherein said conveyor means is inclined from its leading end to its trailing end.

3. The apparatus, as described in paragraph 2, wherein the angle of inclination is approximately forty-five degrees.

4. The apparatus, as described in paragraph 2, wherein said conveyor means, further comprises a plurality of closely spaced rollers, each said roller having vanes thereon, for propelling said compost materials away from said rotary drum; and each said vane having a herringbonelike configuration, symmetrical around a central transverse plane through said roller.

5. The apparatus, as described in paragraph 4, wherein each said roller is perforated; said air injecting means, further comprising a means for feeding said pressurized air into said rollers, so that jets of air issue from said roller perforations into the adjacent said compost materials.

6. The apparatus, as described in paragraph 5, wherein each said roller has an internal hollow shaft extending the full length of said roller, each said hollow shaft, defining an air passageway extending the entire length of the associated roller; and each said shaft having air escape holes spaced therealong for uniformly distributing pressurized air to different zones of said associated roller.

7. The apparatus, as described in paragraph 2, wherein said conveyor means further comprises an endless perforated conveyor belt; and said air injection means comprising a pressurized air nozzle means, oriented to spray jets of air through said belt perforations, onto said compost materials on the belt surface.

8. The apparatus, as described in paragraph 7, wherein said endless conveyor belt has an overall length greater than the diameter of said rotary drum.

9. An apparatus for turning and recombining subdivided compost materials in an elongated compost windrow; said apparatus comprising a chute means advanceable into and along a compost windrow, said chute means having a leading end and a trailing end; a rotary plow means located within said chute means at its leading end, for throwing said compost materials upwardly as said chute means moves along said windrow; a conveyor means located within said chute means, said conveyor means having a leading end in near proximity to said plow means, so that said compost materials thrown upwardly by said plow means, are deposited onto said conveyor means; said conveyor means being adapted to move said compost materials from said plow means, to the trailing end of said chute means for discharge; and means for injecting pressurized air into said compost materials, while they are being transported by said conveyor means.

10. The apparatus, as described in paragraph 9, wherein said plow means comprises a rotary drum extending transversely across said chute means, said rotary drum having teeth projecting therefrom, adapted for penetrating said compost windrow, and propelling said compost materials upwardly.

11. The apparatus, as described in paragraph 9, wherein said conveyor means has a trailing end elevated above its leading end, whereby at least some of the conveyed compost materials are enabled to gravitationally fall back down as they move toward the trailing end of said chute means, thereby promoting the separation of said compost materials, while on said conveyor means.

12. The apparatus, as described in paragraph 9, wherein said conveyor means has a trailing end elevated above its leading end, so that compost materials deposited onto said conveyor means move upwardly at an angle of approximately forty-five degrees; and the inclination of said conveyor means, being such that at least some of the conveyed compost materials are caused to gravitationally fall as they proceed toward said trailing end of said chute means.

13. The apparatus of paragraph 9, wherein said conveyor means has a trailing end, spaced an appreciable distance from its leading end; and said conveyor means being inclined from its said leading end to its said trailing end, at an angle of approximately forty-five degrees.

14. The apparatus, as described in paragraph 9, wherein said conveyor means further comprises a plurality of hollow rollers extending transversely across said chute means, each said roller having perforations extending along its length and around its circumference; and said air injecting means further comprising means a means for feeding pressurized air into said rollers, so that jets of air are generated at said roller perforations.

15. The apparatus, as described in paragraph 14, wherein said rollers have axles located in an inclined plane extending transversely across the chute means, whereby each succeeding roller has its axle elevated above the axle of the preceding roller.

16. The apparatus, as described in paragraph 15, wherein the axle locator plane is inclined at approximately forty-five degrees.

17. The apparatus, as described in paragraph 14, wherein each said hollow roller, has an internal hollow shaft extending the full length of said roller; each said hollow shaft, having at least one end thereof open for admittance of pressurized air into said shaft interior space; each said hollow shaft having air escape holes spaced therealong for supplying air to the associated roller; said air escape holes being oriented to maintain a relatively constant air pressure along the length of said associated roller.

18. The apparatus, as described in paragraph 14, wherein each said roller has vanes thereon, adapted to propel compost materials away from said plow means, and towards said trailing end of said chute means.

19. The apparatus, as described in paragraph 18, and further comprising a means for power rotating each roller around its axis.

20. The apparatus, as described in paragraph 9, wherein said conveyor means further comprises two transversely-extending rollers, and an endless perforated conveyor belt trained around said rollers; said conveyor belt having an upper run for conveying compost materials to the trailing end of said chute means; said air injection means comprising an air plenum located directly underneath the upper run of said conveyor belt; and said plenum having multiple air jet openings oriented to discharge pressurized air upwardly through said perforated belt and into contact with associated compost materials.

21. The apparatus, as described in paragraph 20, wherein said transversely-extending rollers have axles located in an inclined plane extending transversely across said chute means, whereby said upper run of said perforated conveyor belt is inclined.

22. The apparatus, as described in paragraph 21, wherein the axle locator plane is inclined at approximately forty-five degrees.

23. The apparatus, as described in paragraph 20, wherein said air plenum occupies substantially the entire space between said rollers, whereby a major portion of said conveyor belt upper run, is adapted to receive said pressurized air from said plenum jet openings.

24. The apparatus, as described in paragraph 9, wherein said chute means further comprises two upstanding parallel chute side walls; two ground wheels located outboard from each said chute side wall for supporting said apparatus; a means for attaching said compost-turning apparatus to a three-point hitch of a farm tractor; and said attaching means comprising a transversely extending platform locatable behind said tractor, with said compost-turning apparatus extending alongside said tractor, whereby said chute means and said tractor have parallel offset paths, while apparatus is advancing along a compost windrow.

25. The apparatus, as described in paragraph 24, and further comprising drive connections from the tractor power take off to said plow means and said conveyor means.

26. The apparatus, as described in paragraph 24, and further comprising an air compressor means, operated from the tractor power take off, to supply pressurized air to said air injecting means.

DESCRIPTION OF A PREFERRED EMBODIMENT OF THE INVENTION

Figure 1:
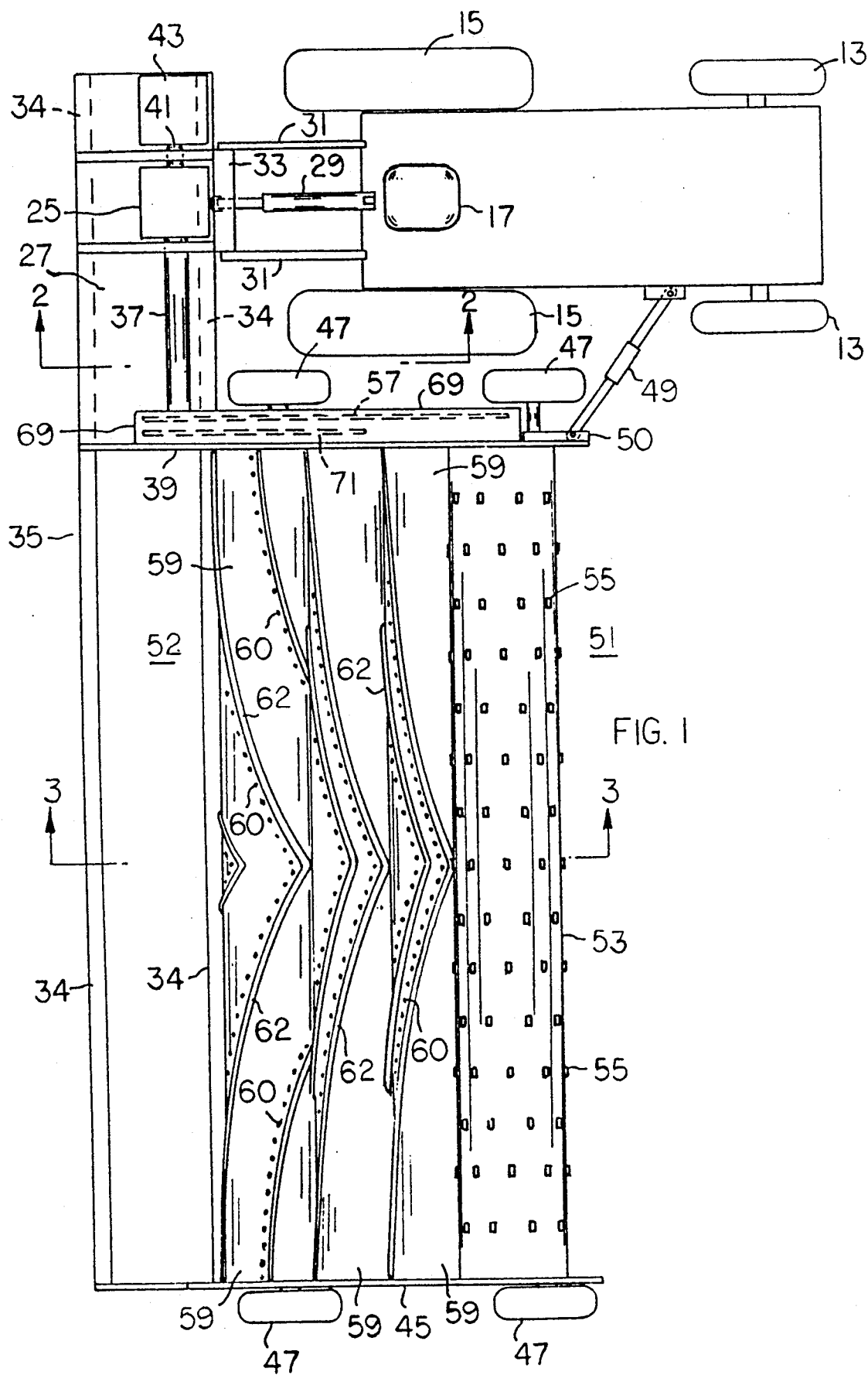
FIG. 1, is a top plan view, of an apparatus embodying the present invention.

FIG. 1, is a top plan view, of an apparatus embodying the present invention.

Figure 2:
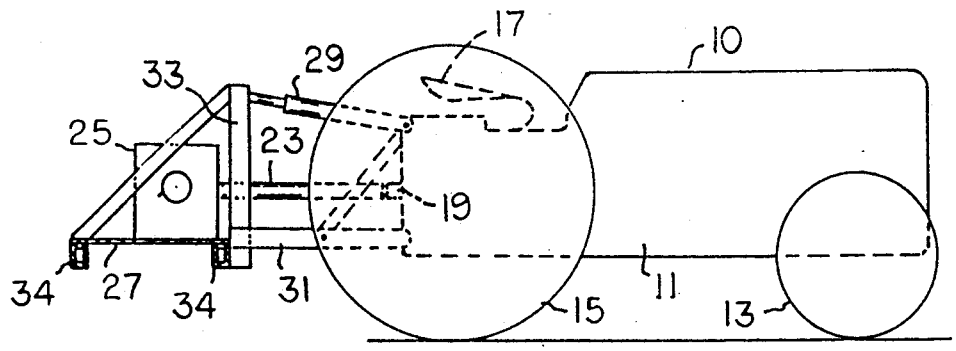
FIG. 2, is a sectional view, taken along line 2—2, in FIG. 1.

FIG. 2, is a sectional view, taken along line 2—2 in FIG. 1.

Referring now to FIGS. 1 and 2, there is shown in FIG. 2, a conventional farm tractor, depicted at 10, having a chassis 11, front wheels 13, rear wheels 15, and a driver's seat 17. The tractor 10, has a power take-off connection, that includes a horizontal stub shaft 19, adapted to receive an auxiliary shaft means 23.

Auxiliary shaft means 23, transmits power from stub shaft 19, to a gear box 25, mounted on a horizontal platform 27. Platform 27, forms part of a mechanism designed for operatively connecting the tractor 10, to a compost-turning mechanism, that constitutes the present invention.

Tractor 10, is also equipped with a conventional three-point hitch, that includes a top control link 29, on the tractor centerline, and two bottom links 31, spaced equidistant from the tractor 10 centerline. Control link 29, includes a hydraulic cylinder, that is used for height control of implements towed behind the tractor, e.g., a plow, etc. The bottom links 31, handle the pulling load.

In the present invention, as illustrated in FIGS. 1 and 2, an upright frame 33, is connected to link 29, via connector pins (not shown). Frame 33, is rigidly affixed to two elongated horizontal beams 34, that extend laterally from the tractor hitch, to the compost-turning apparatus, designated generally by numeral 35. Platform 27, is mounted on the horizontal beams 34.

Gear box 25, has a first elongated output shaft 37, extending to an upstanding wall 39, located on the compost-turning apparatus. Output shaft 37, serves as a drive means for a rotary drum agitator and a multi-roller conveyor, located in apparatus 35. The ends of output shaft 37, may be equipped with universal joints, in order to facilitate a satisfactory drive action from gear box 25, to the powered devices located in apparatus 35.

Figure 3:
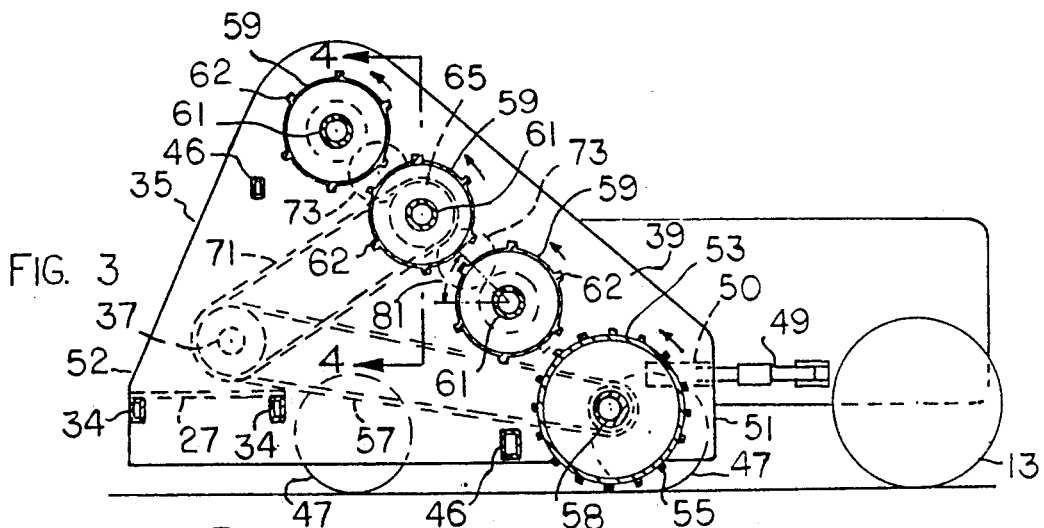
FIG. 3, is a sectional view, taken along line 3—3, in FIG. 1.

FIG. 3, is a sectional view, taken along line 3—3, in FIG. 1.

Gear box 25, has a second output shaft 41, for operatively driving an air compressor, depicted as 43. The air compressor 43, provides pressurized, or compressed air, for an aerating means, that forms part of apparatus 35.

The compost turning apparatus 35, further comprises an upstanding chute, formed by two parallel upstanding side walls, i.e., 39 and 45. These two walls, 39 and 45, are rigidly interconnected into a unitary construction, by the aforementioned beams 34, and two additional transverse beams 46, as shown in FIG. 3. The chute structure, is supported by four ground wheels 47, i.e., two wheels located outboard from the respective chute side walls.

As previously noted, the chute structure is rigidly attached to horizontal beams 34, and hence to the three-point hitch of the tractor 10. The chute structure can be additionally attached to the tractor 10, via a tie rod means 49, trained between the tractor chassis and chute side wall 39. The chute side wall 39, can be locally reinforced at the tie rod attachment point, by means of a horizontal channel 50.

The leading end of the chute structure, is designated by numeral 51, whereas the trailing end of the chute structure, is designated by numeral 52. Extending transversely across the chute structure at its leading end, is a cylindrical drum 53, having a series of teeth 55, projecting from the outer surface of drum 53. Drum 53, constitutes a rotary plow means, for throwing compost materials upwardly and rearwardly, into the chute structure. The drum 53, has a through shaft 58, extending through chute side walls 39 and 45, whereby the drum 53, is mounted for rotation around its longitudinal axis. Drum 53, will typically have a diameter of about twenty-four inches, and the drum length, can be on the order of about sixteen feet. Teeth 55, will typically have a projection length, on the order of from about two or to about three inches.

Drum 53, is a powered drum, having a rotational speed of from about five hundred to about eight hundred revolutions per minute. Power for rotating drum 53, is taken from aforementioned output shaft 37. As shown diagrammatically in FIG. 3, a drive chain 57, extends from the output shaft 37, to the shaft 58, of drum 53. Each shaft has a sprocket in mesh with drive chain 57.

As the tractor moves the compost-turning apparatus 35, in a left-to-right direction, as seen in FIG. 1, the teeth 55, on drum 53, engage the compost materials, to exert a lifting and shredding action, thereon. The divided compost materials, are thereby, lifted and thrown in a right-to-left direction onto a conveyor, defined by three horizontal conveyor rollers 59. In an alternate arrangement, not shown in the drawings, four rollers, or more, may be used.

Each roller 59, comprises a hollow steel cylinder, having a diameter of about eighteen inches. A number of vanes 62, project from the roller 59 surface, for driving the compost materials in a right-to-left direction, i.e., away from drum 53. As shown in FIG. 1, each vane 62, extends the full axial length of the associated roller 59, for conveying all of the compost materials in the chute, i.e., the entire transverse chute dimension. The vanes 62, can be V-shaped, or herringbone-shaped in order, to promote migration of compost materials toward the chute centerline, i.e., away from walls 39 and 45. As viewed in FIG. 1, the chute centerline is coincident with slight line 3—3. During operation of the apparatus the chute is aligned with the windrow centerline, and the chute moves along a path defined by the chute centerline, i.e., longitudinally along the windrow. The number and configuration of vanes 62, on each roller 59, can be varied in the practice of the present invention. Each vane 62, typically will have a projection distance of from about one to about two inches. Each roller 59, is also a power-driven roller.

Each roller 59, has perforations 60, extending around its circumference for conducting jets of pressurized air, or, in certain applications, pressurized oxygen, from the zone within the roller 59, to the zone outside the roller 59. The perforations 60, may be arranged in rows paralleling the vanes 62. Compost materials moving over the roller 59 surfaces, due to the actions of vanes 62, will be impacted by the air or oxygen jets. The air jets will tend to break up the compost materials, especially when they are in a damaged or weakened condition. Also, the air jets will tend to separate one particle from another, such that a greater surface area will then be exposed to the air action. As the compost materials later recombine into a newly formed windrow, at least some of the air will tend to remain in contact with the recombined materials, i.e., within the compost windrow bed. It should be noted that whenever air is mentioned, it may also refer to oxygen, either pure, or in various dilutions of air, or other gases.

Figure 4:
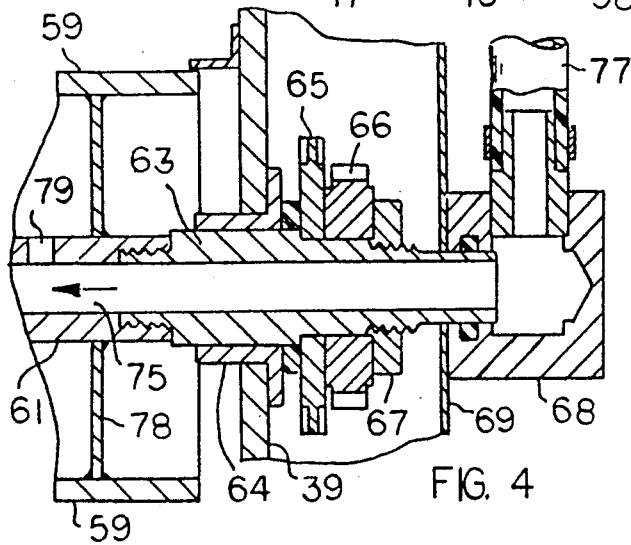
FIG. 4, is an enlarged fragmentary sectional view, taken along line 4—4, in FIG. 3.

FIG. 4, is an enlarged fragmentary sectional view, taken along line 4—4, in FIG. 3.

Each roller 59, has a hollow through shaft, that rotatably supports the roller 59, and also acts as an air or oxygen supply device for the roller 59. FIGS. 3 and 4, illustrate the general features of a mechanism suitable for driving the conveyor rollers 59. As shown in FIG. 4, a machined end member 63, is threaded into the associated shaft 61. A sleeve bearing 64, is press fit in chute side wall 39, to rotatably support the shaft members, i.e., 61 and 63. A sprocket 65, and gear 66, are keyed onto a square cross-sectioned portion of shaft member 63, while nut 67, retains the sprocket and gear in position on the shaft 63.

The non-illustrated end of shaft 61, will have a machined member, similar to member 63, but without provision for a sprocket or gear. Still referring to FIG. 4, the right end of shaft member 63, extends into a hollow fitting, or coupling, 68, that is suitably mounted on a guard housing 69. Housing 69, is not shown in FIG. 3, but in practice it would enclose the shaft ends of the three rollers 59, as well as a drive chain 71, that extends between shaft 37 and the sprocket 65, shown in FIGS. 3 and 4.

A sprocket on shaft 37, transmits a rotary drive force to sprocket 65, for driving the associated roller 59. The gear 66, on the FIG. 4 shaft, is in mesh with two gears 73, shown in FIG. 3, that are in mesh with similar gears on the shafts of the other two rollers 59. In this manner, the two additional rollers 59, are also gear-driven by shaft 37.

Each roller shaft, i.e., comprised of members 61 and 63, has a central axial passageway 75, shown in FIG. 4, extending essentially its full axial length, whereby pressurized air or oxygen, can flow from an associated coupling 68, along the air passageway 75, as indicated by the arrow in FIG. 4. A pressure tubing system 77, extends from the aforementioned air compressor 43, to each coupling 68, whereby the shaft 61, of each roller 59, is supplied with pressurized air. The end of each roller shaft 61, at chute side wall 45, is closed to prevent undesired air escapage.

As shown fragmentarily in FIG. 4, each roller 59, may be mounted on an associated shaft 61, by a series of disks 78. Preferably, there are at least three disks 78 for each roller, i.e., a disk 78, near each end of the shaft 61, and a third disk 78, at, or near, the longitudinal centerline of the chute structure. Each shaft 61, has air holes 79, spaced along the shaft 61, for supplying pressurized air or oxygen to the space within the associated roller 59.

There is a danger that, if air holes 79, are not correctly sized, or spaced, the roller 59, will not be uniformly filled with air, i.e., that the end of the roller 59, at chute wall 39, will receive the predominant amount of the pressurized air, thereby, leaving other internal areas of the roller 59, relatively depressurized. Therefore, the air holes 79, should be sized and graduated, so that a relatively small air hole area is provided near chute wall 39, and relatively larger air hole areas are provided remote from wall 39. Areas in near proximity to chute wall 45, do not require a large air hole area, because of the ram air effect of the air impacting the closed end of the shaft 61. An optimum system will have shaft 61, distributing essentially the same quantity of pressurized air or oxygen to all sections of the roller 59. As previously noted, air within each roller 59, is exhausted through jet openings, or perforations 60, to aerate the compost materials.

It will be seen from FIG. 3, that the three rollers 59, are arranged in an ascending, or inclined, relationship, with the leading roller 59, at the lowest level, and the trailing roller 59, at the highest level. The support shafts 61, or axles for the rollers 59, are arranged on an imaginary inclined plane, having an inclination angle 81, of approximately forty-five degrees.

The inclined axle arrangement, is advantageous, in that while the compost materials are ascending the roller conveyor, due to the impetus of vanes 62, some of the compost materials gravitationally fall back toward drum 53. Thus, there is a gravitational churning of the compost materials, resulting in an enhanced mixing and particlefragmentation action. The drawing shows a roller conveyor comprised of three conveyor rollers 59. However, a greater number of rollers 59 can be used. The number of rollers 59, is somewhat dependent on the height of the windrow. The last, or trailing roller 59, has to be higher than the height of the windrow, in order to reform the windrow into its desired cross-sectional configuration.

Typically, the windrow will have a humped, or semicircular, cross-section, with the height along the windrow centerline being about seven or eight feet. With such a windrow height, the roller conveyor will have four rollers 59. The herringbone shape of the roller vanes 62, is designed to achieve a gravitational discharge action, wherein relatively great quantities of compost material, are discharged near the chute centerline, thereby promoting the formation of a hump-like windrow cross section.

Figure 5:
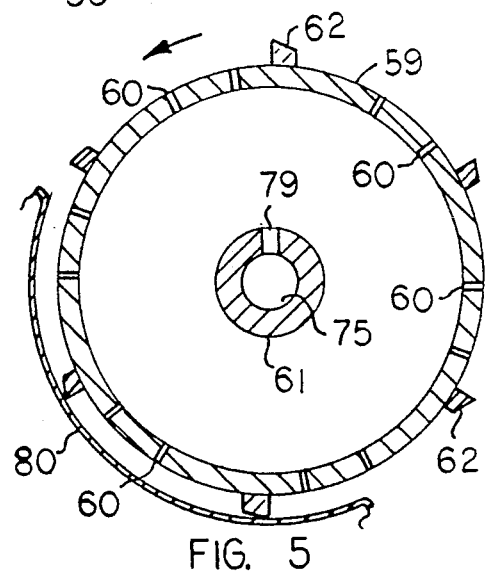
FIG. 5, is an enlarged fragmentary sectional view, taken through a conveyor roller, used in the FIG. 1 apparatus.

FIG. 5, is an enlarged fragmentary sectional view, taken through a conveyor roller, used in the FIG. 1 apparatus.

FIG. 5, illustrates an optional baffle plate arrangement, that can be used for minimizing the usage of compressed air or oxygen. An arcuate baffle plate 80, surrounds the lower portion of the associated roller 59, whereby only the perforations 60, facing the compost materials are effective for air spray purposes. Baffle plates 80, will have lengths related to the roller 59 lengths.

Figure 6:
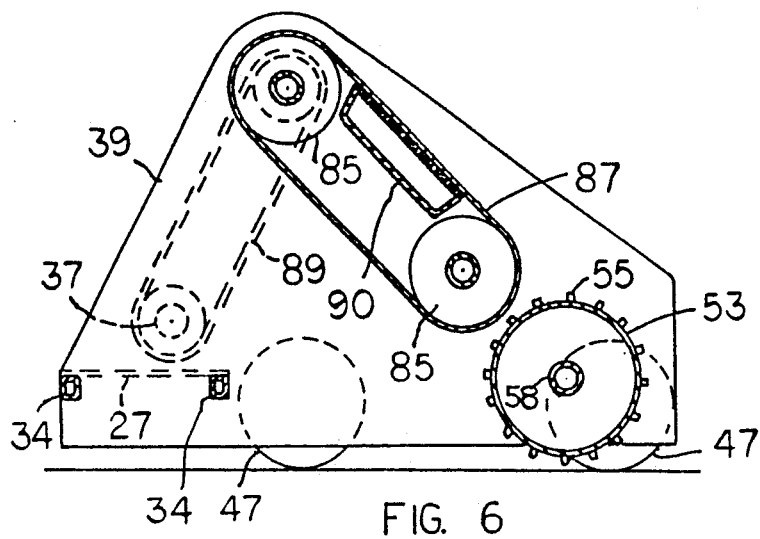
FIGS. 6 and 7, are views, taken in the same direction as FIG. 3, but illustrating other embodiments of the present invention.
Figure 7:
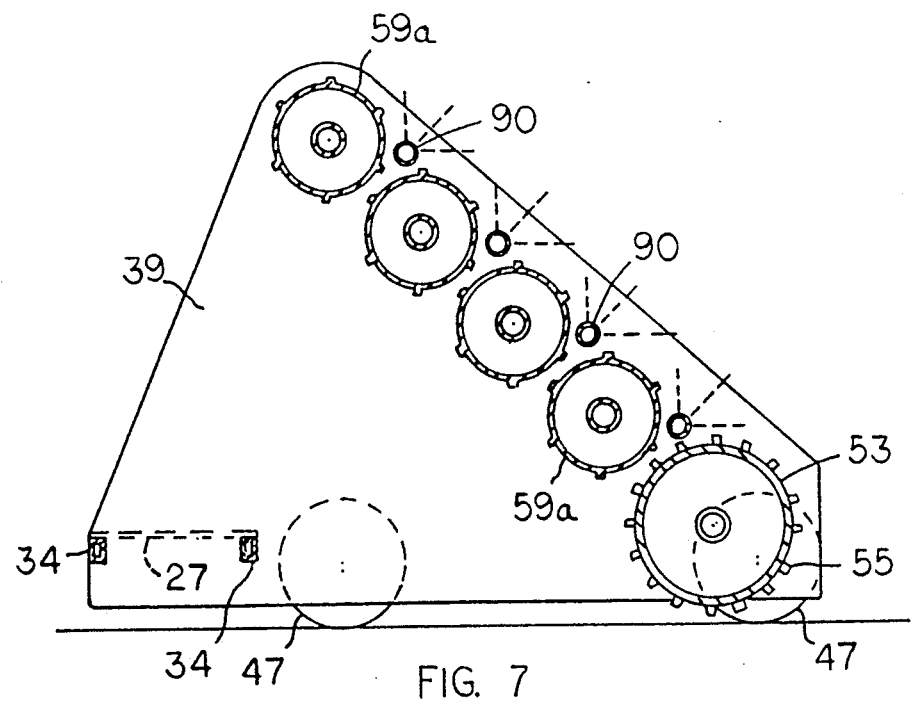

FIGS. 6 and 7, are views, taken in the same direction as FIG. 3, but illustrating other embodiments of the present invention.

FIG. 6, illustrates an alternate type of conveyor that can be used in the present invention. The FIG. 6 conveyor, includes two rollers 85, extending the full width of the chute for supporting an endless conveyor belt 87. Each roller 85, will have projecting shaft ends, or axles, journalled in bearings located in the chute side walls. A sprocket will be carried on the shaft of the trailing roller 85, for meshed engagement with a drive chain 89, that is trained around a drive sprocket, carried on shaft 37. Conveyor belt 87, extends the full width of the chute, for transporting the compost materials from drum 53.

Conveyor belt 87, is formed of a flexible perforated screen material, whereby pressurized air can be sprayed upwardly, through the upper run of the belt 87, to impact against the compost materials riding on the belt 87 upper surface. In the embodiment of FIG. 6, the pressurized air is taken from a sheet metal air plenum 90, located below the upper run of the conveyor belt 87. Air jet holes are drilled in the upper wall of the plenum 90, for jet-like discharge of air or oxygen from the plenum, and thence through the perforated belt 87. A tubing system (not shown) will extend from the air compressor 43, shown in FIG. 1, to plenum 90. The tubing system can be designed to feed pressurized air or oxygen into the plenum at multiple points, e.g., through each chute side wall, and the plenum bottom wall.

Operationally, the FIG. 6 apparatus is quite similar to the apparatus of FIGS. 1 through 5. Drum 53, throws compost materials onto the conveyor belt 87, which conveys the materials leftwardly, and upwardly, to the discharge point, i.e. at the trailing roller 85. Jets of pressurized air or oxygen are sprayed through the belt 87, onto the compost materials. Also, some of the compost material intermittently falls back toward drum 53, which churns and agitates the materials.

FIG. 7, illustrates a conveyor arrangement that is similar to the arrangement of FIGS. 1 to 5, except that the rollers 59a, are imperforate rollers. Pressurized air is sprayed onto the compost materials from stationary pipes 90. Each pipe 90, extends transversely between the chute side walls. Small holes, spaced along the length of each pipe 90, on its upwardly facing surface, constitute nozzles for spraying air or oxygen onto the compost materials. Rollers 59a, can be rotatably driven by the same type of chain-gear system, that is shown in FIG. 3.

It should be noted that the drawings necessarily show specific structures and configurations used in practicing the present invention. However, it will be readily appreciated that the present invention, can also be practiced utilizing other equivalent forms.

Therefore, the previous detailed description of the preferred embodiments of the present invention is presented for purposes of clarity of understanding only, and no unnecessary limitations should be understood, or implied therefrom, as all appropriate mechanical, electrical, and functional equivalents to the above, which may be obvious to those skilled in the arts pertaining thereto, are considered to be encompassed within the claims of the present invention.

What is claimed is:

1. A mobile apparatus for turning and recombining sub-divided compost material in an elongated compost windrow, wherein the compost windrow has a length dimension, a width dimension, and a height dimension;

said apparatus being adapted for movement into and along the windrow in the direction of the windrow length;

said apparatus comprising a chute means having a centerline defining the movement axis of the apparatus;

said apparatus being operable so that the chute means is advanceable into and along a compost windrow with its movement axis coincident with the longitudinal centerline of the windrow;

said chute means having a leading end and a trailing end;

a transversely-extending rotary drum at the leading end of said chute means, said drum having teeth thereon for propelling compost materials upwardly over the drum as said drum penetrates the windrow;

a conveyor means located within said chute means;

said conveyor means having a leading end in near proximity to said rotary drum, and a trailing end at the trailing end of said chute means;

said conveyor means being inclined from its leading end to its trailing end so that compost materials are caused to move progressively upwardly as they are transported by the conveyor means from said rotary drum to the trailing end of the chute means;

a first power means for rotatably driving said drum so that the drum deposits compost materials on the leading edge of the conveyor means;

a second power means for driving the conveyor means so that said conveyor means transports the compost materials through the trailing end of the chute means;

the trailing end of said conveyor means being elevated to at least the windrow height so that the entire windrow is churned and relocated as the apparatus advances into and along the windrow length;

means for injecting pressurized air into the compost materials while they are being transported by said conveyor means;

said air injecting means being located within said conveyor means for directing jets of air through the conveyor means into the compost materials while they are located on the conveyor means; and said air injecting means comprising an array of perforations occupying the space between the leading and trailing ends of said conveyor means, so that air is injected into the compost materials for a significant percentage of the time that said materials are locate don the conveyor means.

2. The apparatus as described in claim 1, wherein said conveyor means comprises a plurality of closely spaced rollers, each said roller having vanes thereon for propelling compost materials away from said rotary drum;
  each said vane having a herringbone configuration symmetrical around a plane coincident with the centerline of said chute means;
  each said roller being a hollow roller having perforations distributed therealong; and
  said perforations comprising said air injecting means for directing jets of air into the compost materials as they are being propelled by the rollers.

3. The apparatus, as described in claim 1, wherein said conveyor means comprises an endless perforated conveyor belt; and said air injection means comprising a pressurized air nozzle means, oriented to spray jet of air through said belt perforations, onto said compost materials on the belt surface.

4. The apparatus, as described in claim 3, wherein said endless conveyor belt has an overall length greater than the diameter of said rotary drum.

* * * * *